United States Patent

Hashimoto et al.

[11] 3,985,806
[45] Oct. 12, 1976

[54] PROCESS FOR CONTINUOUSLY MANUFACTURING ACRYLAMIDE

[75] Inventors: Nobuyoshi Hashimoto, Yokohama; Kiyotaka Yoshimura, Mobara; Shiro Asano; Tadatoshi Honda, both of Yokohama; Ryozi Tsuchiya, Kamakura, all of Japan

[73] Assignee: Mitsui Toatsu Chemicals, Incorporated, Tokyo, Japan

[22] Filed: Aug. 10, 1972

[21] Appl. No.: 279,309

[30] Foreign Application Priority Data
Aug. 19, 1971 Japan.................................. 46-62558

[52] U.S. Cl............................................. 260/561 N
[51] Int. Cl.$^2$.................................. C07C 103/133
[58] Field of Search.................................. 260/561 N

[56] References Cited
UNITED STATES PATENTS
3,381,034 4/1968 Greene et al.................... 260/561 N
3,631,104 12/1971 Habermann et al............ 260/561 N Primary Examiner—Ethel G. Love
Attorney, Agent, or Firm—Fisher, Christen & Sabol

[57] ABSTRACT

A process for continuously manufacturing acrylamide by hydrating acrylonitrile in the presence of a free metallic copper catalyst, characterized in that a reactor is employed, which is internally partitioned into a catalyst slurry circulating section and a catalyst precipitating section, and that raw materials and supplementary catalyst are supplied continuously into the reactor and at the same time the clear reaction liquid and a portion of the catalyst are continuously taken out of the reactor so that the properties of the catalyst are maintained constant.

7 Claims, 3 Drawing Figures

3,985,806

PROCESS FOR CONTINUOUSLY MANUFACTURING ACRYLAMIDE

BACKGROUND OF THE INVENTION

It is known that acrylamide (or methacrylamide) can be prepared from acrylonitrile (or methacrylonitrile) in the presence of a free metallic copper catalyst such as Raney copper or reduced copper (see U.S. Patent Application, Ser. No. 56,967, filed on July 21, 1970. When executing such a method industrially, a continuous manufacturing process is carried out at a reaction temperature in the range of 60° – 200° C and in the presence of a catalyst in the form of a fixed or fluid bed, the amount of the catalyst used is in the range of 1–1,000 gram per each 1 mol of acrylonitrile (or methacrylonitrile) used as raw material. When reduced copper is employed as catalyst, a fixed bed is commonly used in consideration of the grain size of the catalyst. On the other hand, when Raney copper or a reduced copper of a relatively larger grain size is employed, a fluid bed is commonly used.

In general, when a continuous reaction is to be carried out using of any one of the catalysts as mentioned above, a preselected amount of raw materials and catalyst which are mixed together into a slurry state are introduced into the reactor and, at the same time, a portion of the slurry is taken out of the reactor to be supplied into a liquid cyclone or thickener, the greater part of the catalyst is separated, and then the residual catalyst in the reaction liquid is filtered off.

In such a continuous manufacturing process of acrylamide, the reaction is performed in the presence of catalyst having a relatively high concentration as mentioned above. This occurs, when such an ordinary method is employed, a number of problems as described below.

The acrylamide synthesizing reaction is characterized in that the catalyst is used in a large quantity compared with the reaction liquid and additionally the catalyst is used in a porous or spongy state so that, handled by a pump during after-treatment for the reaction product, the catalyst may readily be crushed into pieces of smaller mesh sizes. Especially when a centrifugal slurry pump is utilized, the catalyst will be crushed and increasingly finer particles will be produced as time passes, which will reduce the separating efficiency of the thickener and therefore increase the amount of the catalyst to be filtered.

The point of great importance is that the change in the grain size of the catalyst will lead to variations in the surface area of the catalyst so that, even if the other conditions are maintained constant, the amount of reaction per each unit amount of catalyst will be varied and, therefore, conversion of acrylonitrile cannot be maintained constant.

SUMMARY OF THE INVENTION

An object of this invention is to provide a novel process for manufacturing acrylamide by continuously hydrating acrylonitrile in the presence of a free metallic, copper catalyst having a relatively high concentration such as Raney copper or other reduced copper in the form of fluid bed.

Another object of this invention is to maintain the amount of catalyst reacting within the reactor at a constant value.

Still another object of this invention is to maintain a constant grain size distribution of the catalyst within the reactor.

A further object of this invention is to prevent as far as possible the catalyst from being crushed into increasingly finer particles in the course of reaction and after-treatment for the reaction product.

According to this invention, while supplying continuously acrylonitrile, water and supplementary catalyst into a reactor having a free metallic copper catalyst previously charged therein, a reaction is effected in the reactor within the catalyst slurry circulating section having an agitating function. The reaction liquid and catalyst slurry are separated in the catalyst precipitating section, which is in substantial communication with the catalyst slurry circulating section and has the function of preventing fluid flow within the reactor. Then a portion of catalyst slurry is continuously taken out of the catalyst slurry circulating section and the clear reaction liquid is also continuously taken out of the catalyst precipitating section, whereby acrylamide can be manufactured continuously while maintaining the amount of the catalyst reacting within the reactor at a constant value.

The process of this invention also enables maintenance of constant grain size distribution of the catalyst within the reactor.

Furthermore, with the process of this invention it is possible to effectively prevent the catalyst from being crushed into fine particles in the course of reaction and after-treatment for the reaction product.

Brief description of the drawing

In the accompanying drawings.

DESCRIPTION OF PREFERRED EMBODIMENT

In the process of this invention for manufacturing acrylamide, the catalyst is processed in the following manner.

There are defined within a tank type reactor a section for circulating the catalyst slurry and a section for gravitationally precipitating the catalyst, and the latter section is arranged, for example, around or above the former section. The acrylamide forming reaction is carried out in the catalyst slurry circulating section, and then the catalyst is separated from the reaction liquid within the catalyst precipitating section. The fine granular catalyst still remaining in the clear reaction liquid from the catalyst precipitating section is collected by filtration to be discarded or, if necessary, transferred to a known catalyst regeneration process. In this case, a portion of the catalyst slurry is also continuously taken out of the catalyst slurry circulating section in the reactor to be transferred into a filter for separation. The catalyst which has been separated in this manner may be discarded, if necessary, or reused in a known regeneration process. The filtrate obtained from filtration of the catalyst slurry is then transferred to the process for purifying and separating acrylonitrile together with the filtrate obtained from filtration of the reaction liquid.

In the reactor, there exists always the constant amount of catalyst which is in a steady state. In other words, the catalyst within the reactor has a constant grain size and surface area. It will now be understood that, owing to a catalyst separating function developed in the reactor, there is no change in the amount of reacting catalyst due to crushing of the catalyst, and the required filtering area of the filter can be reduced to a large extent. In addition, a pump means for the catalyst slurry which contains formed acrylamido and unreacted acrylonitrile, a liquid cyclone and a thickener which are all indispensable in the prior art processes, can be omitted.

Now the process according to this invention will be described with reference to the drawings which represent preferred various apparatus for executing the process of the invention.

Figure 1:
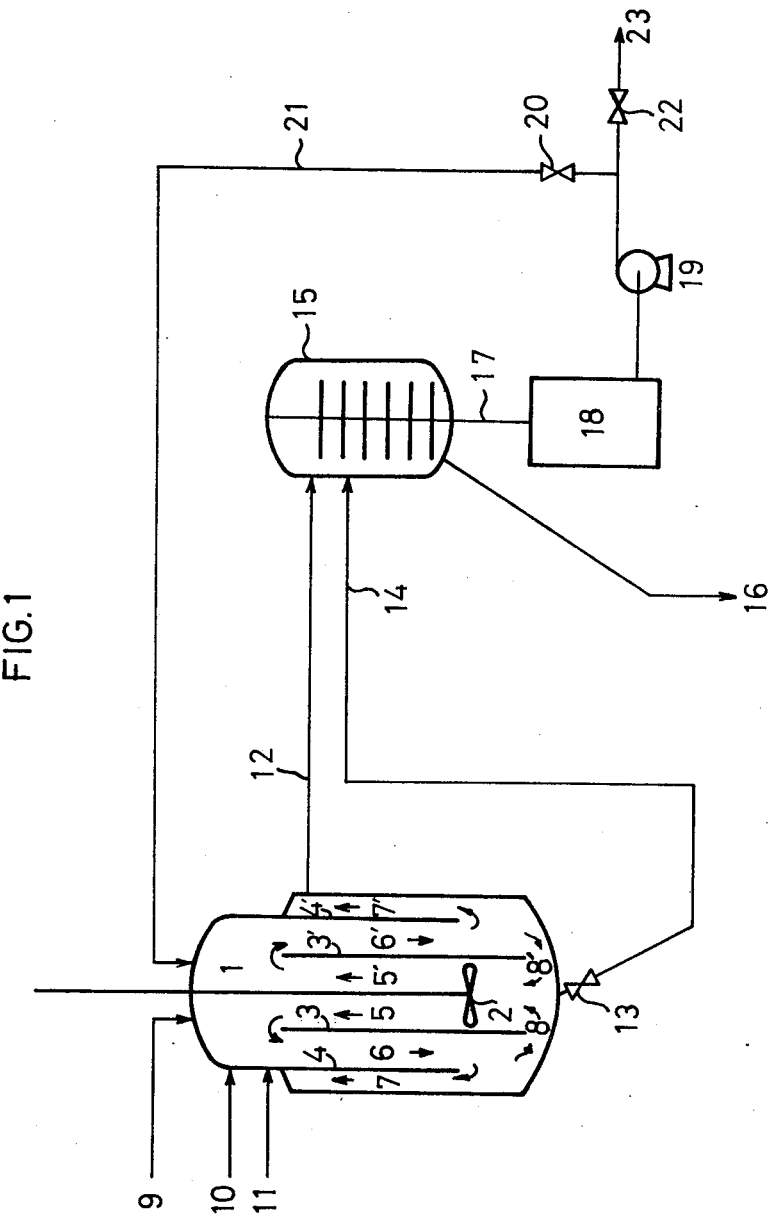
FIG. 1 shows a system according to an embodiment of this invention.

In FIG. 1, reactor 1 is maintained at a pressure and temperature required for the reaction and is filled with a slurry of solid catalyst and the reaction liquid which contains such starting materials as acrylonitrile and water. There is also contained in the reactor such a reaction product as acrylamide. The agitator 2 is provided with a rotatable agitating vane which has a suitable configuration for attaining a good contacting and mixing condition of the reaction liquid and catalyst.

The catalyst slurry circulating section is partitioned with coaxially arranged cylindrical partition plates 3, 3' and 4, 4' into an inner cylindrical portion 5, 5' and an annular portion 6, 6'. Between the inner cylindrical portion 5, 5' and the annular portion 6, 6' is formed an annular space 8, 8' for allowing smooth circulation of the catalyst slurry by the action of the agitator 2. The circumferential annular portion 7, 7' forms the catalyst precipitating section.

The fluid flow within the reactor is represented by small arrows. By the action of agitator 2, the catalyst slurry is forced to flow upwardly within the inner cylindrical portion 5, 5' and, upon reaching near the liquid surface, the catalyst slurry turns about and then flows downwardly along the annular portion 6, 6'. Upon reaching the bottom of the reactor, most of the slurry passes through the spacing 8, 8' and again flows into the inner cylindrical portion 5, 5'. Whereas an amount of slurry, which corresponds to the amount of reaction liquid to be extracted, flows from the annular portion 6, 6' into the circumferential annular portion 7, 7'. During slowly flowing within the circumferential annular portion in the upward direction, the catalyst having a larger specific gravity will be separated by precipitation. Then the catalyst having been concentrated in this manner will be allowed to flow towards the spacing 8, 8'.

The lines 9, 10, 11 are adapted respectively to supply catalyst, acrylonitrile and water. The catalyst is mixed with water and supplied continuously in the form of slurry.

The reaction liquid from which the greater part of catalyst has been separated is taken out of the catalyst precipitating section through a line 12 and transferred into a filter 15, wherein the residual catalyst is filtered off completely. The liquid extracted from the reactor through the line 12 contains a little amount of catalyst. A portion of the catalyst is drawn out of the catalyst slurry circulating section by way of a value 13 which is so designed that it has a structure suitable for handling the catalyst slurry. The extracted catalyst is transferred along a line 14 into the filter for separation. The catalyst collected as a filter residue is partially discarded through a line 16 and the balance is transferred to the catalyst reclamation process. The velocity at which the catalyst is taken out from the line 16 is maintained substantially equal to the catalyst supplying velocity into the line 9. The catalyst employed in this reaction is so designed that it allows the execution of all the necessary operations in the presence of an inert gas under a condition in which the catalyst is sealed or under a condition in which the catalyst is dipped in a liquid.

The filtrate passes through the line 17 and liquid reservoir 18, and then is pumped by a pump 19 to the subsequent treating process by way of a valve 22 and line 23. Since the amount of liquid flowing in the line 23 corresponds to the quantity of acrylamide to be prepared, the excessive portion of the liquid is returned to the reactor 1 by way of a value 20 and line 21.

In this manner by employing a reactor comprising a catalyst slurry circulating section and a catalyst precipitating section, by extracting through the line 12 the reaction liquid containing only a small quantity of catalyst and at the same time by continuously extracting through the line 14 a portion of the catalyst from the catalyst slurry circulating section, the quantity, grain size distribution and activity of the catalyst within the reactor can be maintained constant.

So long as a catalyst slurry circulating section and a catalyst precipitating section are included, the reactor may be made into many constructions other than that having cylindrical partition walls arranged coaxially as illustrated in FIG. 1.

Figure 2:
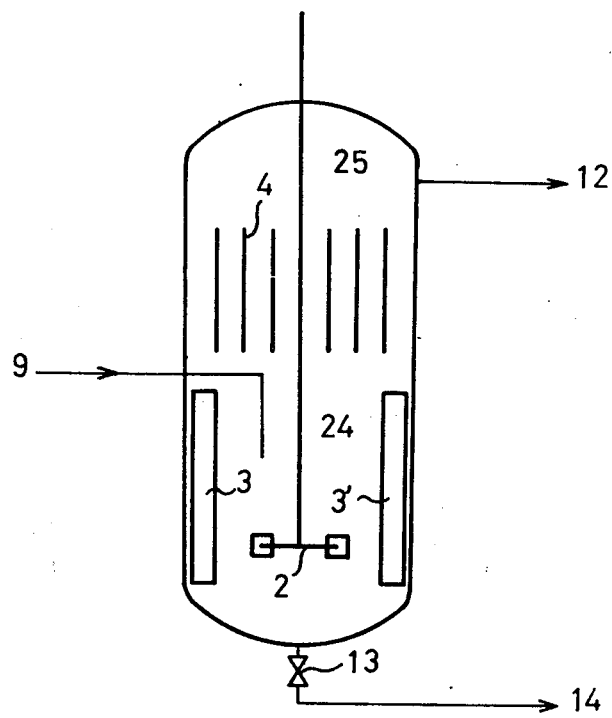
FIG. 2 shows a reactor according to another embodiment of this invention.

FIG. 2 represents another type of reactor. In this type of reactor, a catalyst slurry circulating section 24 is formed in the lower part of the reactor, and a catalyst precipitating section 25 is formed in the upper part of the reactor. In order to attain a good contacting and mixing condition between the reaction liquid and catalyst, an agitator 2 and baffle plates 3,3' are arranged in the catalyst slurry circulating section 24. Upon termination of the time period required for forming acrylamide, the catalyst slurry is forced to move upwardly until it reaches the catalyst precipitating section 25. In the catalyst precipitating section are disposed flow-regulating plates or rods 4, which prevent the disturbance in the liquid flow and promote the separation of catalyst from the reaction liquid. Acrylonitrile, water and catalyst are introduced through the line 9 into the catalyst slurry circulating section 24, and are mixed uniformly by means of the agitator 2 and baffle plates 3, 3'. On the other hand, the clear liquid from which the catalyst has been separated is pulled out through the line 12 and transferred to the filter in such a manner as shown in FIG. 1. In the catalyst precipitating section 25, the catalyst is precipitated due to its own weight and reaches again the catalyst slurry circulating section 24. A portion of the catalyst slurry is pulled out of the catalyst slurry circulating section 24 by way of the valve 13 and then transferred into the filter through line 14.

The same effect may be attained by use of a reactor other than those described above with reference to FIGS. 1 and 2. For example, the reactor may be such a type that has a catalyst slurry circulating section arranged in the lower portion of the reactor and a catalyst precipitating section arranged in the upper portion of the reactor, these two sections being separated from each other by means of, for example, a perforated plate or the like which is perforated to such an extent that the precipitating catalyst is not accumulated on the plate. Furthermore, the reactor may be such a type which does not include a cylindrical partition plate 3, 3' but includes a perforated cylindrical partition wall 4,4' defining the catalyst slurry circulating section and the catalyst precipitating section.

According to the invention, when manufacturing acrylamide continuously by hydrating acrylonitrile in the presence of a free metallic copper catalyst, the reaction conditions may be properly selected from the following range of manufacturing conditions.

The reaction temperature is normally in the range of 25°–200° C, and preferably in the range of 60°–150° C. The reaction pressure is in the range of 0–300 Kg/cm$^2$, and preferably in the range 0–20 Kg/cm$^2$. The quantity of the catalyst used in the reactor is normally in the range of 1–1,000 grams per each 1 mol of acrylonitrile, and the quantity of water is in the range of 0.01–100 mols per each 1 mol of acrylonitrile.

The concentration of the catalyst in the reaction liquid contained in the catalyst slurry circulating section is normally in the range of 0.5–40 weight %.

The quantity of the fine catalyst contained in the reaction liquid, which has been pulled out of the catalyst precipitating section in the reactor, can be reduced in a day to as low as 0.01–10 % of the concentration of the catalyst in the reaction liquid within the reactor; whereas the quantity of the catalyst contained in the catalyst slurry extracted from the catalyst slurry circulating section can normally be as low as 0.1–100 % of the quantity of the catalyst in the catalyst slurry contained in the reactor per day. For supplementing the catalyst discarded, a corresponding amount of fresh or reclaimed catalyst is supplied into the reactor.

EXAMPLE 1

With use of a system shown in FIG. 1, a slurry containing 7.46 weight parts of Raney copper catalyst and 785.2 weight parts of water per every one hour was introduced continuously through line 9 into the reactor 1 which has 500 weight parts of Raney copper catalyst previously charged therein. At the same time, 382.6 weight parts of acrylonitrile was supplied through line 10 into the reactor. The grain size distribution of the Raney copper catalyst used is represented by Curve (1) in FIG. 3. All the water used as a raw material was supplied through the line 9 together with the catalyst. Reaction was continued at a temperature of 120° C for 2.5 hours (these conditions were determined depending upon the capacity of the catalyst slurry circulating secton). Reaction liquid was sampled in the line 12 at 3 hours after initiation of reaction. As a result, it was found that the reaction liquid contained 20 weight % of acrylamide, 14.9 weight % of acrylonitrile and 65.1 weight % of water. The amount of the catalyst contained in the reaction liquid was about 0.1 % thereof.

By adjusting the valve 13, 26.9 weight parts of catalyst slurry having a concentration of 27.4 weight % was pulled out of the reactor continuously and supplied into the filter separated. The catalyst by the filter was then transferred to the reduction process for subsequent use. About 1185 weight parts of the filtrate was transferred by the pump 19 to the purifying process and the balance was pumped back to the reactor.

With such a process, the conversion ratio of acrylonitrile to acrylamide could be maintained at about 50 %. It was found that the composition of the clear liquid taken out at 100 hours after initiation of the reaction was almost similar to that mentioned above and had such a grain size distribution of the catalyst as shown by Curve (2) in FIG. 3.

EXAMPLE 2

As shown in FIG. 2, the lower half of the experimental agitating reaction tank having a capacity of 20 l was designed as a catalyst slurry circulating section and the upper half of the tank was designed as a catalyst precipitating section in which flow-regulating rods were disposed. In the reaction tank, which had 200 grams of Raney copper catalyst previously charged therein, there was supplied continuously by use of a small slurry pump a slurry having an equal grain size distribution to the catalyst employed in Example 1, and the concentration of the Raney copper catalyst in the slurry was 2 weight %. Acrylonitrile was supplied at a velocity of 6 l/h; water at 12 l/h; and catalyst at 26 g/h. The catalyst slurry of 20 weight % concentration was extracted continuously from the catalyst slurry circulating section for filtration in the filter. The other conditions were the same as in Example 1.

During the measuring period of 120 hours, the amount of fine catalyst flowing out of the reactor accompanied by the clear liquid was in the order of 0.6–0.9 grams per every one hour, and the conversion ratio of acrylonitrile to acrylamide was 46–48 %. The grain size distribution of the catalyst which was pulled out at 100 hours after initiation of reaction was substantially equal to Curve (2) in FIG. 3.

COMPARATIVE EXAMPLE

Crushing of the catalyst by means of the pump was examined in connection with the case when a reactor having a capacity of 60 liters but including no partitioned sections was employed. With use of an acrylamide synthesizing system comprising a reactor, circulating pump, thickener and filter, 10 l of acrylonitrile, 18 l of water and 40 grams of Raney copper catalyst of a type equal to those employed in Examples 1 and 2 were supplied every one hour into the reactor, and pulled out of the reactor continuously an amount corresponding the supplied materials. The catalyst slurry of 28 weight % concentration was pulled out of the reactor containing 19.2 Kg of Raney copper catalyst at a velocity of 600 l/h and pumped into the thickener by means of a circulating pump, and then recycled into the reactor.

Figure 3:
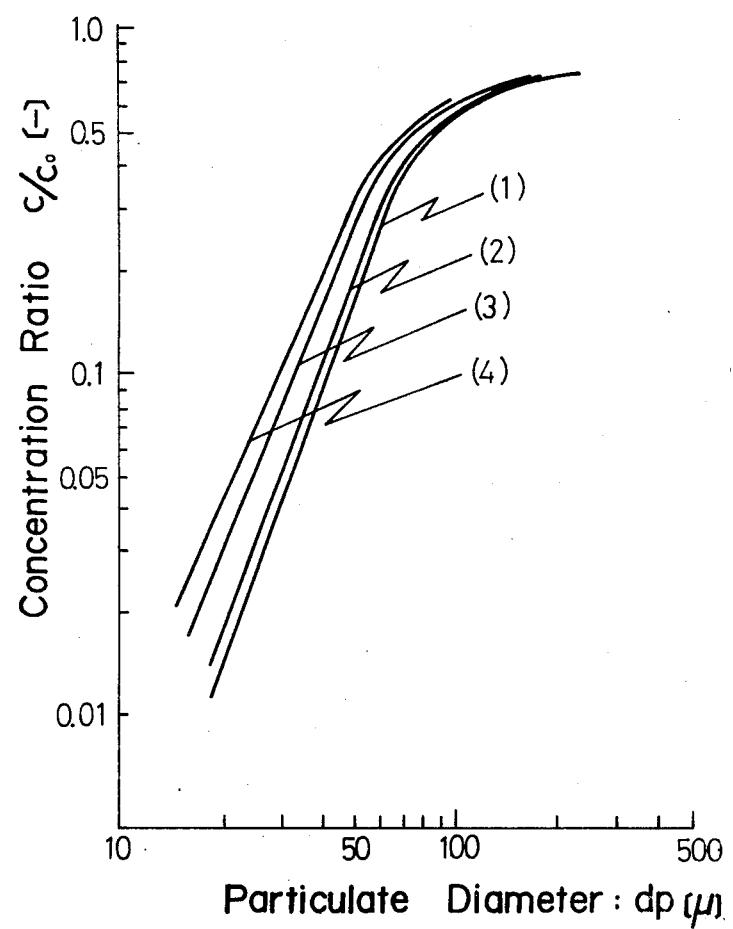
FIG. 3 is a graph for representing the crushed condition of the catalyst, each curve showing the result of any one of the Examples of this invention which will be described hereinunder.

The grain size distribution of the catalyst at 72 hours and 144 hours after initiation of experiment is shown by Curves (3) and (4) in FIG. 3, respectively. From these curves it will be understood that the catalyst is crushed into increasingly finer particles with the time and, therefore, catalysis conditions cannot be maintained constant within the reactor.

We claim:

1. A process for continuously manufacturing acrylamide by hydrating acrylonitrile in the presence of a free metallic copper catalyst, which process comprises: continuously supplying reaction materials acrylonitrile, water and supplementary catalyst into a catalyst slurry circulating section of a reactor and reacting said materials under agitation; passing said reaction material into a catalyst precipitating section in said reactor and in substantial communication with said catalyst slurry circulating section and substantially stopping the fluid flow therein to separate the reaction materials into reaction liquid and catalyst slurry; cotinuously removing said reaction liquid from which a major portion of catalyst has been separated from said catalyst precipitating section; and simultaneously removing a portion of catalyst slurry from the catalyst slurry circulating section.

2. The process according to claim 1 wherein at least a portion of catalyst which has been separated from the reaction liquid is discarded.

3. The process according to claim 1 wherein the amount of catalyst contained in the reaction liquid removed from the catalyst precipitating section is in the range of 0.01 – 10 weight % of the amount of catalyst charged into the reactor per day.

4. The process according to claim 1 wherein the amount of catalyst contained in the catalyst slurry separated in the catalyst slurry circulating section is in the range of 0.01 – 100 weight % of the amount of catalyst charged into the reactor per day.

5. The process according to claim 1 wherein the free metallic copper catalyst is Raney copper.

6. The process according to claim 1 wherein the reactor is partitioned by at least one coaxial cylindrical partition plate into said catalyst circulating section and said catalyst precipitating section.

7. The process according to claim 1 wherein the reactor includes in the upper portion thereof said catalyst precipitating section defined by at least one flat or cylindrical baffle plate and in the lower portion thereof said catalyst circulating section.

* * * * *